United States Patent
Ngo et al.

(10) Patent No.: US 9,998,923 B2
(45) Date of Patent: Jun. 12, 2018

(54) SYSTEMS, METHODS AND COMPUTER-READABLE STORAGE MEDIA FACILITATING ACCESS POINT MANAGEMENT VIA SECURE ASSOCIATION OF AN ACCESS POINT AND A MOBILE DEVICE

(71) Applicant: NETWORK PERFORMANCE RESEARCH GROUP LLC, Campbell, CA (US)

(72) Inventors: Terry Ngo, Bellevue, WA (US); Erick Kurniawan, San Francisco, CA (US); Kun Ting Tsai, Fremont, CA (US); Seung Baek Yi, Norwich, VT (US)

(73) Assignee: NETWORK PERFORMANCE RESEARCH GROUP LLC, Campbell, CA (US)

( * ) Notice: Subject to any disclaimer, the term of this patent is extended or adjusted under 35 U.S.C. 154(b) by 0 days. days.

(21) Appl. No.: 15/266,235

(22) Filed: Sep. 15, 2016

(65) Prior Publication Data

US 2018/0077576 A1    Mar. 15, 2018

(51) Int. Cl.

| | |
|---|---|
| *H04M 1/66* | (2006.01) |
| *H04W 12/08* | (2009.01) |
| *H04W 76/02* | (2009.01) |
| *H04W 12/06* | (2009.01) |
| *H04W 68/00* | (2009.01) |
| *H04W 4/00* | (2018.01) |

(52) U.S. Cl.
CPC .......... *H04W 12/08* (2013.01); *H04W 12/06* (2013.01); *H04W 76/021* (2013.01); *H04W 4/008* (2013.01); *H04W 68/005* (2013.01)

(58) Field of Classification Search
CPC .... H04W 12/06; H04W 12/08; H04W 76/021
See application file for complete search history.

(56) References Cited

U.S. PATENT DOCUMENTS

| 8,634,348 B2 * | 1/2014 | Vogedes ................ H04W 4/001 370/328 |
| 2006/0183462 A1 * | 8/2006 | Kolehmainen .......... H04B 5/00 455/411 |
| 2012/0210001 A1 * | 8/2012 | Ryerson ................ H04W 12/08 709/225 |

(Continued)

*Primary Examiner* — Wayne H Cai
(74) *Attorney, Agent, or Firm* — Amin, Turocy & Watson, LLP

(57) ABSTRACT

Access point (AP) management via secure association between APs and mobile devices is facilitated. A method comprises: associating the device with an AP that is locked, wherein the associating is performed via a proximity-based network facilitating communication based on the device and the AP being within a defined distance of one another; unlocking the AP employing a key associated with the device, wherein the unlocking the AP comprises facilitating access to one or more configuration settings of the AP via the device; and enabling a service of the AP and a corresponding service of the device to facilitate change of at least one of the one or more configuration settings via the device. In one embodiment, the associating the device with the AP comprises performing exchange of information between the device and the AP for secure pairing between the device and the AP.

20 Claims, 7 Drawing Sheets

(56) References Cited

U.S. PATENT DOCUMENTS

2015/0327052 A1* 11/2015 Ghai ..................... H04W 8/18
　　　　　　　　　　　　　　　　　　　　　　　　370/328
2016/0337185 A1* 11/2016 Hardison ............ H04L 41/0813
2017/0078896 A1*  3/2017 Kephart, Jr. ........ H04L 41/0823

* cited by examiner

SYSTEMS, METHODS AND COMPUTER-READABLE STORAGE MEDIA FACILITATING ACCESS POINT MANAGEMENT VIA SECURE ASSOCIATION OF AN ACCESS POINT AND A MOBILE DEVICE

BACKGROUND

When a user purchases an access point (AP), the AP must be configured prior to use. Typically, the AP must be accessed by the user manually accessing the machine and the AP is fully open and able to be configured by any user. Documentation provides instructions informing the user of the default password; however, most users never change the password for the AP from the default password and security can be therefore easily compromised rendering the AP vulnerable. Once an intruder applies the default password, the intruder can perform one or more different malicious actions since the default password was never changed and the intruder entry process can be facilitated. Accordingly, systems, methods and computer-readable storage media that facilitate AP management via secure association of an AP and mobile device are desired.

SUMMARY

One or more embodiments described herein relate to AP management and more specifically to systems, methods and computer-readable storage medium that facilitate AP management via secure association between APs and mobile devices.

In an embodiment, a computer-readable storage medium is provided. The computer-readable storage medium can store computer-executable instruction that, in response to being executed by a processor of a device, causes the device to perform operations. The operations can comprise associating the device with an AP that is locked, wherein the associating is performed via a proximity-based network facilitating communication based on the device and the AP being within a defined distance of one another; and unlocking the AP employing a key associated with the device, wherein the unlocking the AP comprises facilitating access to one or more configuration settings of the AP via the device. The operations can also comprise enabling a service of the AP and a corresponding service of the device to facilitate change of at least one of the one or more configuration settings via the device.

In some embodiments, another computer-readable storage medium can store computer-executable instructions that, in response to being executed by a processor of a device, causes the device to perform operations. The operations can comprise: associating the device with a mobile device, wherein the associating is performed via a personal area network facilitating communication; and receiving information causing the device to unlock access to one or more configuration settings of the device, wherein the receiving is from the mobile device and based on the mobile device employing a key generated from the associating, and wherein the device is locked prior to the associating preventing change of one or more configuration settings. The operations can also comprise enabling a service to facilitate change of at least one of the one or more configuration settings of the device by the mobile device.

In another embodiment, a device can comprise: a processor; and a memory that stores executable instructions that, when executed by the processor, facilitate performance of operations. The operations can comprise: associating the device with a mobile device, wherein the associating is performed via a personal area network facilitating communication; and receiving information causing the device to unlock access to one or more configuration settings of the device, wherein the receiving is from the mobile device and based on the mobile device employing a key generated from the associating, and wherein the device is locked prior to the associating preventing change of one or more configuration settings. The operations can also comprise enabling a service to facilitate change of at least one of the one or more configuration settings of the device by the mobile device.

Other embodiments and various examples, scenarios and implementations are described in more detail below. The following description and the drawings set forth certain illustrative embodiments of the specification. These embodiments are indicative, however, of but a few of the various ways in which the principles of the specification may be employed. Other advantages and novel features of the embodiments described will become apparent from the following detailed description of the specification when considered in conjunction with the drawings.

DETAILED DESCRIPTION

Figure 1:
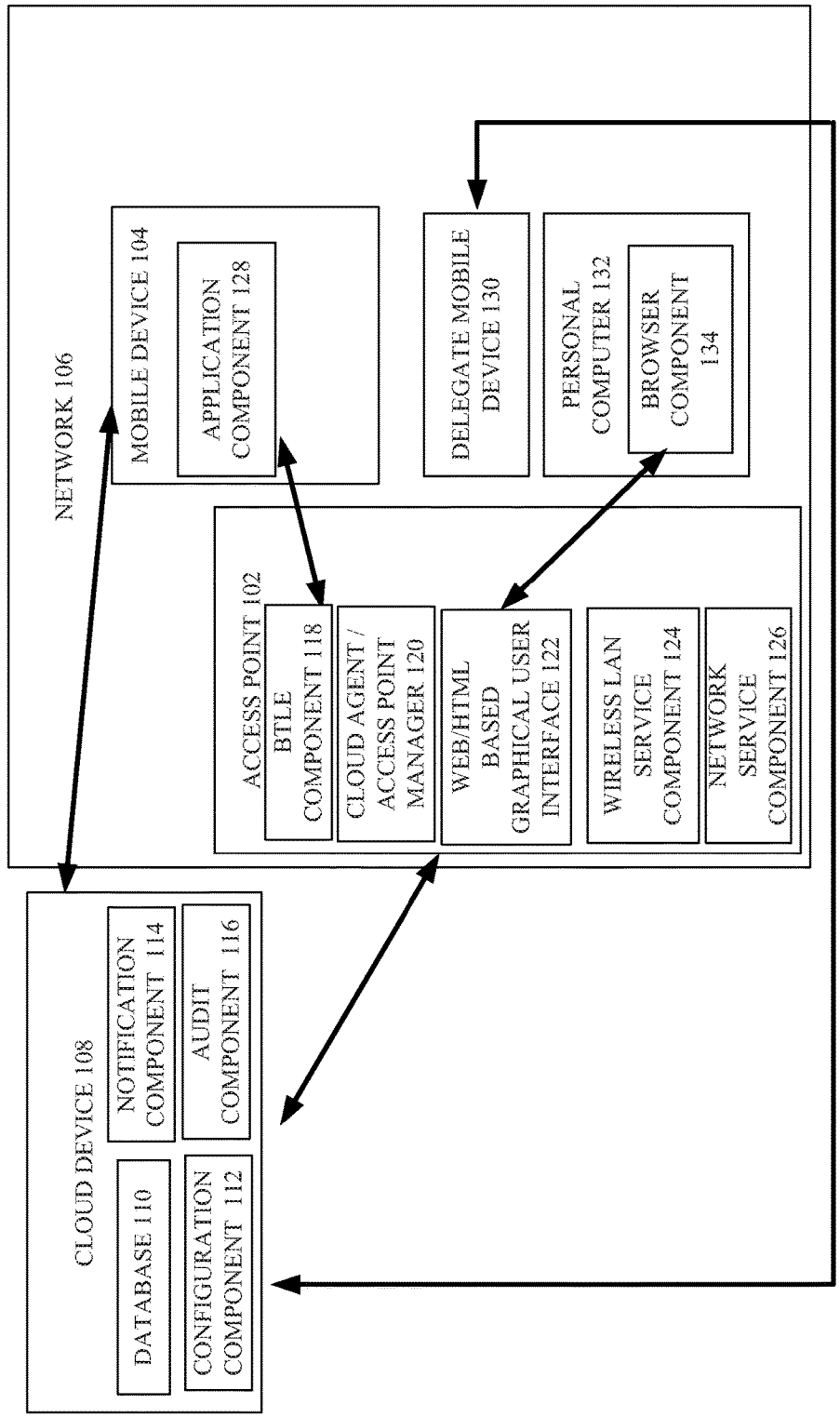
FIG. 1 illustrates an example block diagram of a system that facilitates AP management via secure association between an AP and mobile device in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. As used herein, the terms "server" and "server device" are interchangeable.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity," "user," "user device" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies. Further, the terms "femto" and "femto cell" are used interchangeably, and the terms "macro" and "macro cell" are used interchangeably.

When a user purchases an access point (AP), the AP must be configured prior to use. Typically, the AP must be accessed by the user manually accessing the machine and the AP is fully open and able to be configured by any user. Documentation provides instructions informing the user of the default password; however, most users never change the password for the AP from the default password and security can be therefore easily compromised rendering the AP vulnerable. Once an intruder applies the default password, the intruder can perform one or more different malicious actions since the default password was never changed and the intruder entry process can be facilitated. Accordingly, systems, methods, computer-readable storage media that facilitate AP management via secure association of an AP and mobile device are desired.

With traditional APs, even once the portal to the access point is opened typically any laptop or smartphone can be employed to log in to the AP. As used herein, the term "access point" and "router" are used interchangeably. As used herein, the terms "user" and "user entity" are used interchangeably and can mean a human, business or legal entity. As used herein, the term "user device" can include, but is not limited to, and can be used interchangeably with "mobile device," "personal computer" and "smartphone." One or more embodiments described herein can provide enhanced security such that a user entity or user device (e.g., mobile device, smartphone) is provided access to a user interface (e.g., web graphical user interface). In one or more embodiments, a user (or, in some embodiments, user entity)

can update information (e.g., a cookie or other information element in which information is stored) and this information can provide information to the AP informing the AP that the user entity or user device is authorized to access the AP before the pairing between the user device and AP occurs. As such, after the user entity (or user device) logs into the AP (e.g., which can be facilitated via any number of different types of logins including, but not limited to, a FACEBOOK® login or otherwise), the user entity and/or user device can then be validated and the AP can store information (e.g., a cookie) on the user device so if a hacker is trying to attack the AP, the hacker will be prevented from obtaining information (e.g., a cookie) to hack into the AP because the hacker is not likely to know the login and/or other personal information of the user entity. Or if there is a virus on a user mobile phone, the virus will not likely be able to penetrate the mobile device because the virus will not know the user information.

Turning now to the drawings, FIG. 1 illustrates an example block diagram of a communication system for which management can be facilitated in accordance with one or more embodiments described herein. The system 100 of FIG. 1 can include a cloud device 108, AP 102, and a mobile device 104 communicatively and/or electrically coupled to one another. In some embodiments, the system 100 can also include a delegate mobile device 130 and/or a personal computer 132. The system 100 can securely associate a wireless AP with a user mobile phone (e.g., mobile device 104) in various embodiments.

In the embodiment shown, when the AP 102 is purchased, received and/or obtained by the user, the AP 102 is locked. By contrast, conventional APs purchased by a user initially are typically fully open and unlocked.

When the mobile device 104 is within a defined physical proximity of the AP 102, the user can go through an onboarding process for the AP 102 employing the user mobile device 104. Accordingly, in some embodiments, the AP 102 is initially onboarded and configured by a user via mobile device 104 running a defined application via the application component 128. In some embodiments, the defined application can be a proprietary application that can securely associate the mobile device 104, user and/or the AP 102 in a cloud service (e.g., via cloud device 108).

The implementation has been shown to be able to propagate configuration change information from the AP 102, through the cloud service (e.g., cloud device 108) and to the mobile device 104 (wherever the mobile device 104 is located). Configuration changes can include, but are not limited to, wireless local area network (WLAN) network settings, domain name service (DNS) settings, firewall rules settings and/or changes to parental controls. In some embodiments, mobile device 104 can perform one or more functions to act as the sole, secure entry point for the user mobile device 104 to manage the user network. Information abut this association can be maintained in the cloud device 108 (e.g., cloud service). In some embodiments, information describing this association between the mobile device 104 and the AP 102 can be stored securely in a cloud based service (at the cloud device 108). By default, the AP 102 can be fully locked down until the user configures networking options via the mobile device 104 (e.g., as demonstrated by setting up networks via the application executed and/or processed by the application component 128).

In some embodiments, the onboarding process can involve a secure pairing operation using a wireless radio and protocol. This secure pairing can be performed and/or facilitated with Wi-Fi, Bluetooth or other Personal Area Networking technology. In some embodiments, Bluetooth Low Energy (BTLE) protocol can be employed for the onboarding process to facilitate communications between the AP 102 and the mobile device 104. In some embodiments, BTLE can be employed for personal area network technology on mobile devices (e.g., mobile device 104). However, in other embodiments, any number of different types of wireless technology that provide a personal area network can be employed.

In one embodiment, a BTLE pairing operation using proximity based algorithms can be employed to ensure the mobile device 104 is within a defined proximity of an AP 102. In some embodiments, the application executed and/or processed by the application component 128 of the mobile device 104 and the mobile device 104 are registered with a cloud service (facilitated by the cloud device 108) that stores the association of the user, the application, mobile device 104 and/or the new AP 102.

In various embodiments, the personal area network can be a network wherein the AP 102 can communicate with a mobile device (e.g., mobile device 104) located within a defined distance of the AP 102. In these embodiments, employing the personal area network and based on proximity, the AP 102 and mobile device 104 can securely pair with one another.

In one or more embodiments described herein, after establishment of the secure pairing between the AP 102 and the mobile device 104, the mobile device 104 can act as a secure key that can be employed to unlock the AP 102. In some embodiments, the mobile device 104 can also be employed as a secure key that can enable one or more secure features via the mobile device 104. On the mobile device 104, one or more large keys can be stored. Storage of one or more large keys can provide greater security than requiring the user to type in the user pin at the AP 102. In some embodiments, storage of the one or more large keys in the mobile device 104 that access the AP 102 can result in having an AP 102 that is very secure and/or can allow a number of operations to be performed in a secure manner. One or more embodiments described herein can therefore eliminate (or, significantly reduce) vulnerability resultant from shipping an AP that is not secure (which is the typical approach for providing an AP 102 to a user).

Accordingly, one or more embodiments described herein can employ the mobile phone (or information associated with or stored in the mobile device 104) as a key to unlock one or more advanced configuration features. In some embodiments, the one or more configuration features can include a web-based GUI or can receive one or more notifications on configuration changes detected and/or audited by the cloud (e.g., cloud device 108).

In some embodiments, the system 100 can generate and/or transmit notification of results of periodic networking audits. The networking audits can report potential misconfiguration and/or networking issues (e.g., troublesome or misconfigured devices being added to the home network 106). For example, in some embodiments, some networking equipment added haphazardly to a network can cause connectivity issues or degrade the performance of the home network 106. In some embodiments, the system 100 can perform audits periodically to sense and/or detect networking problems and/or notify the user or the mobile device 104 on suggested remediation steps.

After power up of the AP 102, setup can be performed. The mobile device 104 can associate the AP 102 with the mobile device 104 as part of the setup. In some embodiments, the setup can include, but is not limited to, an exchange of information between the AP 102 and the mobile device 104. In some embodiments, the mobile device 104 can interact with the cloud device 108 (e.g., client cloud) and also cause the AP 102 to interact directly to enable one or more features of the AP 102.

In order to facilitate such enablement, in some embodiments, a two-step process can be performed. The two-step process can result (if successfully performed) in obtaining a password that can enable the configuration to be setup.

In some embodiments, the first step in the two-step process can be to enable the defined and specific service on the mobile device 104 that allows a web service to run on the user mobile device 104. Running the service can enable configuration of the AP 102 through the use of a cable that can be connected between the mobile device 104 and the AP 102. As such, in this embodiment, there is no security vulnerability (e.g., hole) left open each time the user is using the AP 102. The AP 102 is only open during the time the user intends for the AP 102 to be open since when the AP 102 is disconnected from the mobile device 104, the access to the AP 102 is closed.

In some embodiments, through the mobile device 104, the user and/or mobile device 104 can enable additional control interfaces as well as delegate management functions to another user or mobile device 104 (e.g., delegate management functions to delegate mobile device 130). The mobile device 104 can provide a second level of authentication since such changes can only be done through the application in some embodiments.

In one or more embodiments, the mobile device 104 can be designed to provide and/or control and/or select a configuration of an AP 102 instead of requiring a user to physically access the AP 102 (e.g., go into the back of the AP 102), log in and perform one or more steps to configure the AP 102. The mobile device 104 owned by a user is typically a device that is trusted and has the user credentials stored on the device. In some embodiments, the user can enter or send a message (e.g., short message service (SMS) message) or other information to the user mobile device 104 to access the account associated with the AP 102. As such, the mobile device 104 can be used for providing a second level of authentication.

The use of a messaging service like SMS can provide 2-factor authentication. In some embodiments, an SMS message would be sent from the cloud server 108. A user could delegate to another user through a cloud service. Both users would then have accounts on the cloud service. The first level of authentication is the usage of an account on a shared services platform and then using SMS to confirm the identity of either user in granting and/or accepting delegation.

In some embodiments, the AP 102 can have a switch or other option that can be activated or otherwise controlled to turn off the feature of the AP 102 that allows change of the configuration of the AP 102. For example, in some embodiments, the feature can be automatically turned off after a defined amount of time has elapsed since no configuration changes are implemented or requested and/or the feature can be automatically turned off after the mobile device 104 is no longer within a defined proximity of the AP 102.

As shown, the cloud device 108 can include a database 110, notification component 114, configuration component 112 and/or audit component 116. In some embodiments, the notification component 114 can transmit a notification to the mobile device 104 upon detection that an entity other than the mobile device 104 and/or user associated with the mobile device 104 accesses the AP 102 (which can be considered a possible breach of security of the AP 102).

In some embodiments, the mobile device 104 can transmit information to delegate access to a device other than the mobile device 104 (e.g., to delegate access to delegate mobile device 130). As such, the notification component 114 can transmit a notification to the delegate mobile device 130 and/or the mobile device 104 that a change in one or more configuration settings has occurred (which could happen since the user can delegate authority for configuring the AP 102 to others or other devices).

In some embodiments, the mobile device 104 can also receive a notification when an entity or device that is not the mobile device 104 has setup or changed a configuration of the AP 102. As such, if the AP 102 configuration is not authorized and/or is different from information stored by the client cloud (e.g., cloud device 108). In some embodiments, the difference between information stored at the cloud device 108 and the AP 102 configuration can be identified because the cloud device 108 can be communicatively coupled to the AP 102 and, as such, the cloud device 108 can perform an audit of one or more aspects of the AP 102 periodically and/or from time to time and/or based on detection of one or more events. The audit can be performed by the audit component 116. The mobile device 104 can receive a message when/if there is a deviation in the configuration of the AP 102.

After the mobile device 104 receives the notification, in some embodiments, the mobile device 104 can send information (e.g., a kill code) back to the cloud device 108 notifying the cloud device 108 that the mobile device 108 (or user associated with the mobile device 104) did not authorize the change and/or requesting the AP 102 be shut down or locked by the cloud device 108. The cloud device 108 can be instructed to keep the AP 102 inaccessible for further configuration changes or access until the mobile device 104 is again within proximity of the AP 102 and/or the authorized user associated with the mobile device 104 performs a manual or other reset of the AP 102. Accordingly, the mobile device 104 can receive one or more notifications and be able to remediate the changed configuration as another aspect of the embodiments described herein.

In some embodiments, the AP 102 can be locked and no access to the AP 102 is provided based on detection (e.g., by the AP 102, cloud device 108 or mobile device 104) that the mobile device 104 is not logged into the proximity-based network to which the AP 102 is communicatively coupled. If the mobile device 104 fails to connect to the proximity network repeatedly with attempted authenticate, a determination can be made that a potential attack is occurring. If such determination is made, the AP 102 can be immediately locked down. Since the attack in this scenario is proximity-based, the attacking device is near the AP 102. The mobile device 104 and/or true user (which is associated with the mobile device 104) can receive a notification through the cloud service (e.g., via the cloud device 108) that such an event occurred.

In some embodiments, after the cloud associates the AP 102 to a user or mobile device 104 for the user, any changes to configurations of the AP 102 can be sent to the mobile device 104 directly via notifications. The notification can be generated and/or transmitted by the notification component 114. This may also include changes issued by a delegate (e.g., delegate mobile device 130) who also manages the network via the delegate mobile device 130.

Through the notification process, if the user detects suspicious activity with configurations they can command the cloud service to remotely shutdown and lock out the AP until they are within proximity of the device to reconfigure and unlock the AP.

Since the cloud associates the AP to an owner and thus the mobile device 104 of the user, any changes to configurations can be sent to a mobile device of the owner directly via notifications. This can also include changes issued by a delegate (e.g., delegate mobile device 130) that can also manage the network via delegate mobile device 130.

The mobile device 104 can include an application component 128. The AP 102 can include a BTLE component 118, cloud agent/access point manager 120, Web/HTML Based Graphical User Interface 122, wireless local area network (LAN) component 124 and/or network service component 126. In various embodiments, one or more of a BTLE component 118, cloud agent/access point manager 120, Web/HTML Based Graphical User Interface 122, wireless local area network (LAN) component 124 and/or network service component 126 can be electrically and/or communicatively coupled to one another to perform one or more functions of the system 100.

The personal computer 132 can include a browser component 134. The figure depicts the main components of the system. The mobile device 104 can operate a proprietary application (e.g., executed and/or controlled by application component 128) that can utilize the one or more operating system wireless application programming interfaces. In this embodiment, the wireless technology is Bluetooth Low Energy; however any local wireless technology that provides secure device pairing can be employed in various different embodiments. The application can employ the mobile device 104 wireless application stack and radio to securely pair with the enabled AP 102 incorporating the same wireless technology (e.g., BTLE facilitated by BTLE component 118 in this embodiment).

The BTLE component 118 can provide one or more functionalities of an interface. For example, BTLE component 118 can provide proximity information (in some embodiments, in real-time) to limit the range of secure pairing so that the mobile device 104 is correctly paired with the AP 102 at a defined range. In some embodiments, the defined range can be a minimal range at which the AP 102 and the mobile device 104 can communicate with one another and/or detect the presence of one another.

The mobile device 104 can obtain information about the AP 102 and associates the mobile device 104 and/or the application component 128 of the mobile device 104 with the cloud device 108. In some embodiments, the cloud device 108 can be or provide a cloud service. In some embodiments, the cloud service of the cloud device 108 can maintain, in the database 110, information regarding the association between the AP 102 and the mobile device 104. In some embodiments, the application component 128 can configure the AP 102 remotely via the configuration component 112 and the cloud agent residing on the cloud agent/access point manager 120.

The cloud agent configures and enables various WLAN and network services on the network service component 126 and the wireless LAN service component 124 Optionally the user can enable the Web/HTML Based Graphical User Interface 122 which provides advanced configurations offered on a larger screen via the personal computer 132 and browser component 134.

Accordingly, the AP 102 can have an optional web-based graphical user interface (e.g., Web/HTML Based Graphical User Interface 122) that remains disabled unless the owner, via the owner mobile device 104, enables the graphical user interface 122. In some embodiments, the Web/HTML Based Graphical User Interface 122 can also require a login password, but having the mobile device 104 can also enable/disable the Web/HTML Based Graphical User Interface 122 and allows for an additional layer of security (essentially a 2-factor authentication system). In some embodiments, the web Web/HTML Based Graphical User Interface 122 can be turned on and/or off to respectively open or close an access connection of the AP 102 and/or for enhancing security of the AP 102. In some embodiments, the system 100 does not render a traditional GUI on a display (e.g., display of the mobile device 104 or delegate mobile device 130), but instead hosts an HTML service in which the GUI is rendered on the web browser.

In some embodiments, the mobile device 104 can enable a delegate mobile device 130 to manage the AP 102 remotely. Any changes to services that are not initiated by the mobile device 104 and/or the registered application executed and/or controlled by application component 128 can be detected and/or logged. Optionally, in some embodiments, the mobile device 104 can request notifications from the notification component 114 when such changes (e.g., any changes to services not initiated by the mobile device 104 and/or the registered application executed and/or controlled by application component 128) are made. The audit component 116 in the cloud device 108 (e.g., cloud) can periodically check network and WLAN settings to match previously configured settings made through the mobile device 104 application. If one or more settings change and the changes did not originate from the mobile device 104, the audit component 116 can notify the mobile device 104 associated with the user via notification component 114.

In some embodiments, through the notification process, if the mobile device 104 and/or user operating the mobile device 104 detects suspicious activity with configurations the user and/or mobile device 104 can command the cloud device 108 (e.g., cloud service) to remotely shutdown and/or lock out the AP 102 until they are within proximity of the mobile device 104 to reconfigure and unlock the AP 102. Accordingly, in some embodiments, in order to re-enable the AP 102, one option is for the mobile device to be in proximity. Any remediation steps would require the mobile device 104 to be physically present within a defined distance of the AP 102.

While memory and/or processors are not expressly shown in FIG. 1, in some embodiments, one or more of cloud device 108, mobile device 104, AP 102, delegate mobile device 130 and/or personal computer 132 can include a memory and/or processor. Each memory can store one or more computer-readable storage media that can include computer executable instructions to perform one or more functions described herein. One or more of the memory can include one or more processors that can execute the one or more computer-executable instructions.

FIGS. 2, 3, 4, 5 and 6 illustrate example flowcharts of methods that facilitate AP management via secure association between an AP and mobile device in accordance with one or more embodiments described herein. Repetitive description of like elements employed in other embodiments described herein is omitted for sake of brevity.

Figure 2:
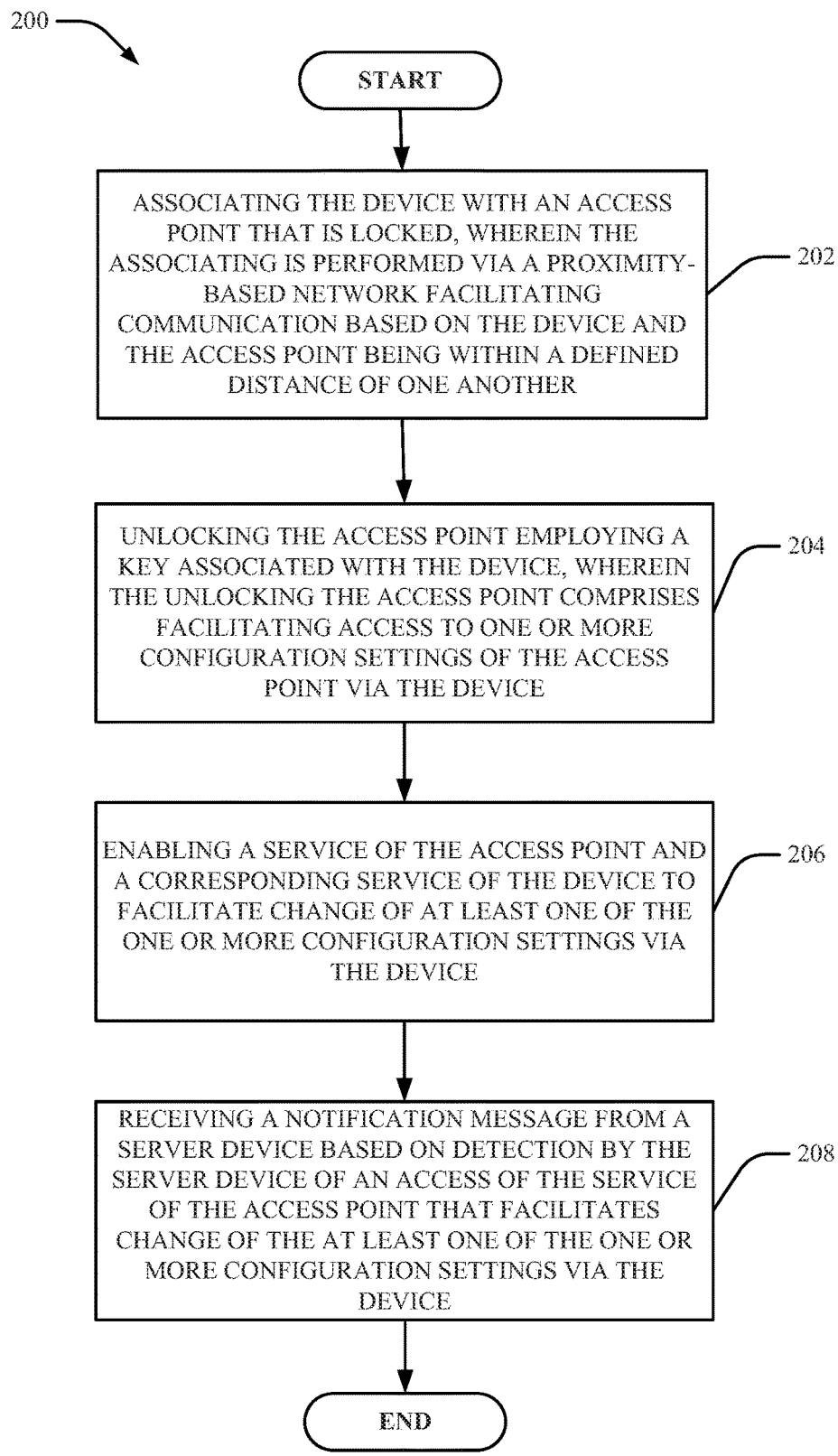
FIGS. 2, 3, 4, 5 and 6 illustrate example flowcharts of methods that facilitate AP management via secure association between an AP and mobile device in accordance with one or more embodiments described herein.

Turning first to FIG. 2, at 202, method 200 can include associating the device with an AP that is locked, wherein the associating is performed via a proximity-based network facilitating communication based on the device and the AP being within a defined distance of one another. In some embodiments, the associating the device with the AP comprises performing exchange of information between the device and the AP for secure pairing between the device and the AP. In some embodiments, the associating the device with the AP further comprises generating the key associated with the device for access of the AP by the device, wherein the generating is based on completion of the secure pairing.

At 204, method 200 can include unlocking the AP employing a key associated with the device, wherein the unlocking the AP comprises facilitating access to one or more configuration settings of the AP via the device. In some embodiments, the one or more configuration settings is associated with at least one of a firewall rule setting, a parental control setting, a network setting or a domain name system setting.

In some embodiments, the device comprises at least one of a web-based graphical user interface or a html-based graphical user interface configured to configure the AP. In some embodiments, the device comprises a mobile device. For example, the mobile device can be or include a smart phone, laptop, personal digital assistant (PDA) or the like.

At 206, method 200 can include enabling a service of the AP and a corresponding service of the device to facilitate change of at least one of the one or more configuration settings via the device. In some embodiments, the associating, the unlocking and the enabling are performed employing BLUETOOTH communication protocol.

At 208, method 200 can include receiving a notification message from a server device based on detection by the server device of an access of the service of the AP that facilitates change of the at least one of the one or more configuration settings via the device. In some embodiments, the notification message also includes information indicative of at least one of the second configuration setting or the first configuration setting and the second configuration setting.

Although not shown, in some embodiments, the method 200 can also include modifying the at least one of the one or more configuration settings via the device. Although not shown, in some embodiments, the method 200 can also include generating a disable message requesting disablement of the AP by the server device.

Figure 3:
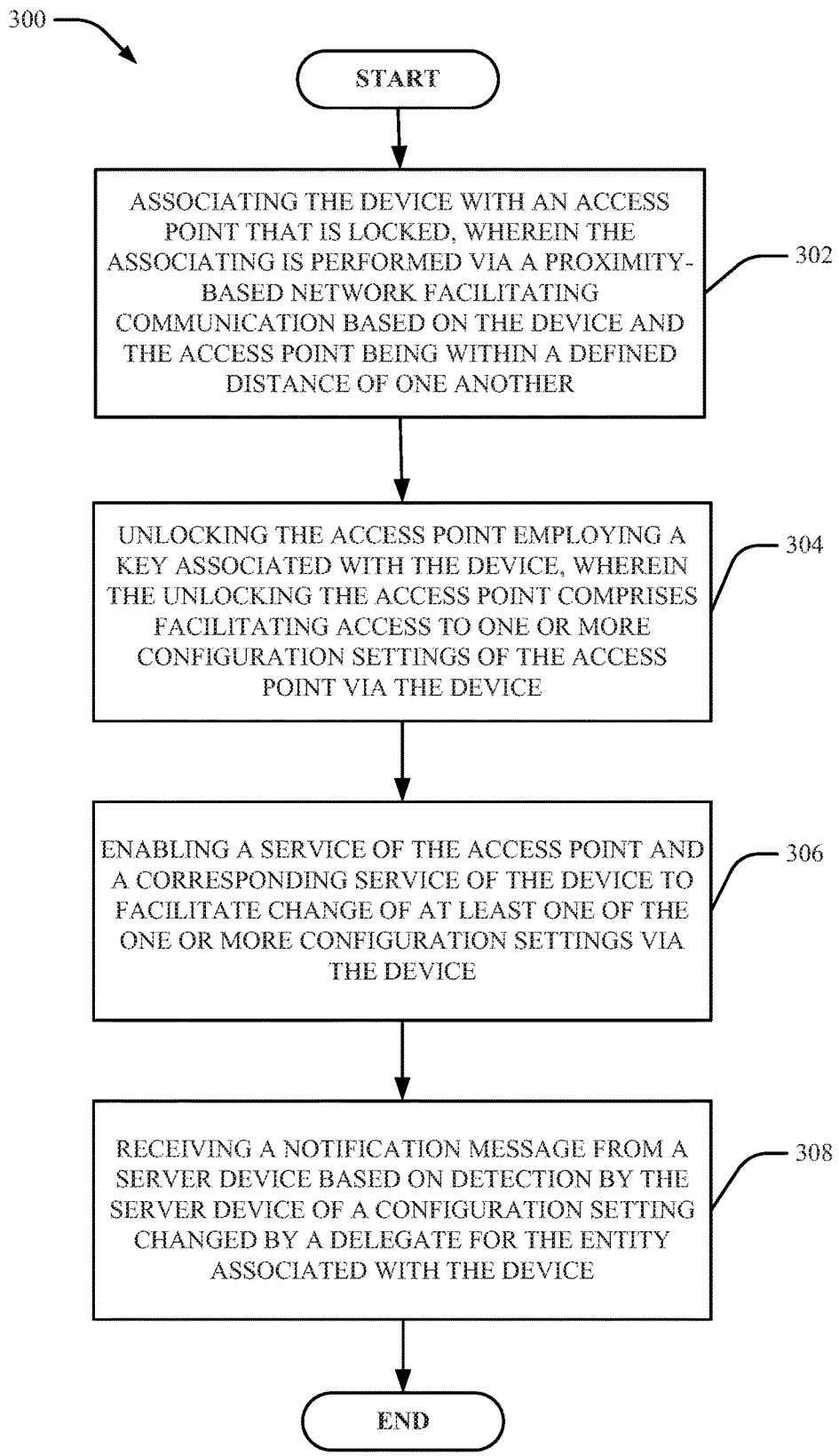

Turning now to FIG. 3, at 302, method 300 can include associating the device with an AP that is locked, wherein the associating is performed via a proximity-based network facilitating communication based on the device and the AP being within a defined distance of one another. At 304, method 300 can include unlocking the AP employing a key associated with the device, wherein the unlocking the AP comprises facilitating access to one or more configuration settings of the AP via the device.

At 306, method 300 can include enabling a service of the AP and a corresponding service of the device to facilitate change of at least one of the one or more configuration settings via the device. At 308, method 300 can include receiving a notification message from a server device based on detection by the server device that a configuration setting of the one or more configuration settings of the AP has changed from a first configuration setting to a second configuration setting.

Figure 4:
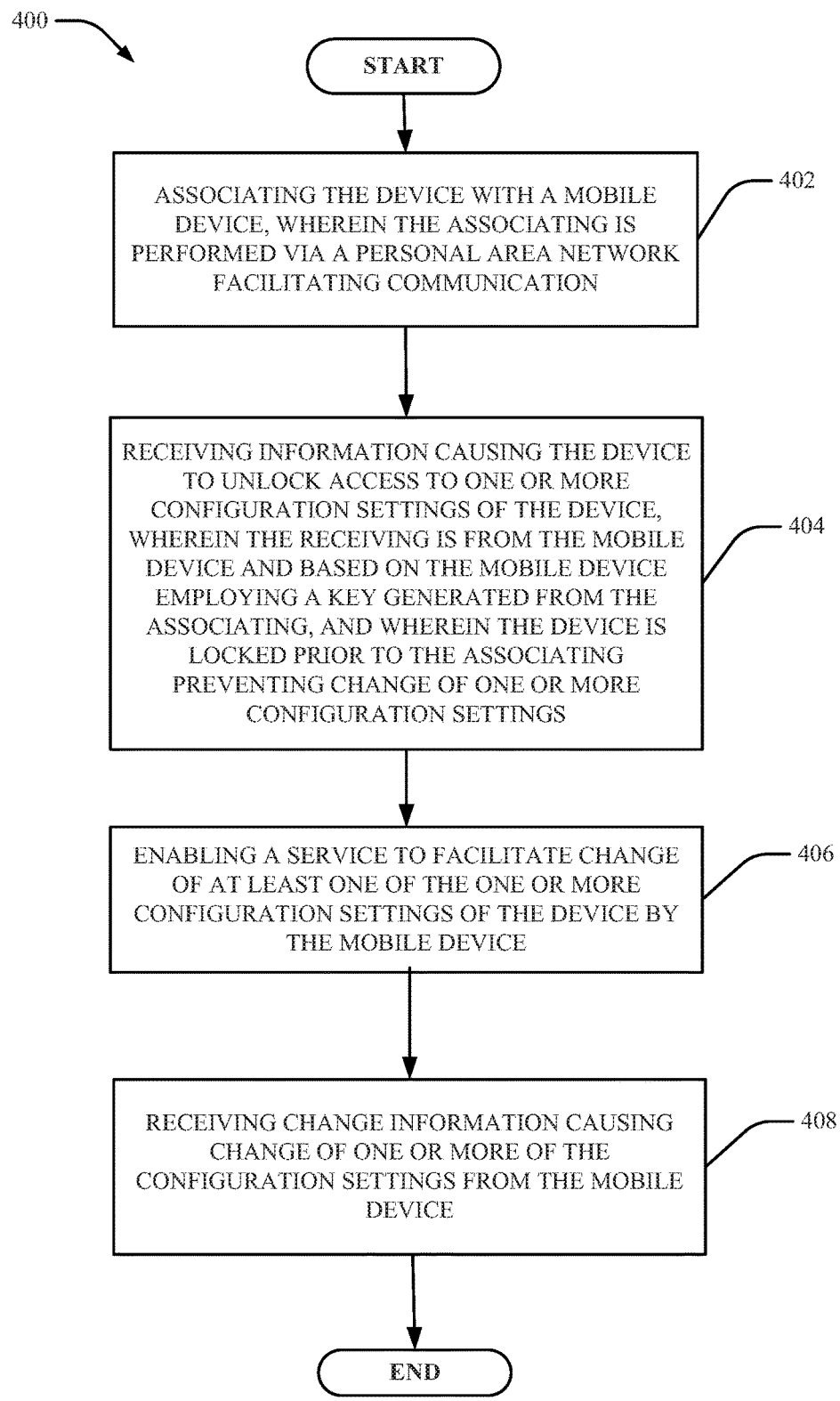

Turning now to FIG. 4, at 402, method 400 can include associating the device with a mobile device, wherein the associating is performed via a personal area network facilitating communication.

At 404, method 400 can include receiving information causing the device to unlock access to one or more configuration settings of the device, wherein the receiving is from the mobile device and based on the mobile device employing a key generated from the associating, and wherein the device is locked prior to the associating preventing change of one or more configuration settings.

At 406, method 400 can include enabling a service to facilitate change of at least one of the one or more configuration settings of the device by the mobile device. At 408, method 400 can include receiving change information causing change of one or more of the configuration settings from the mobile device.

Figure 5:
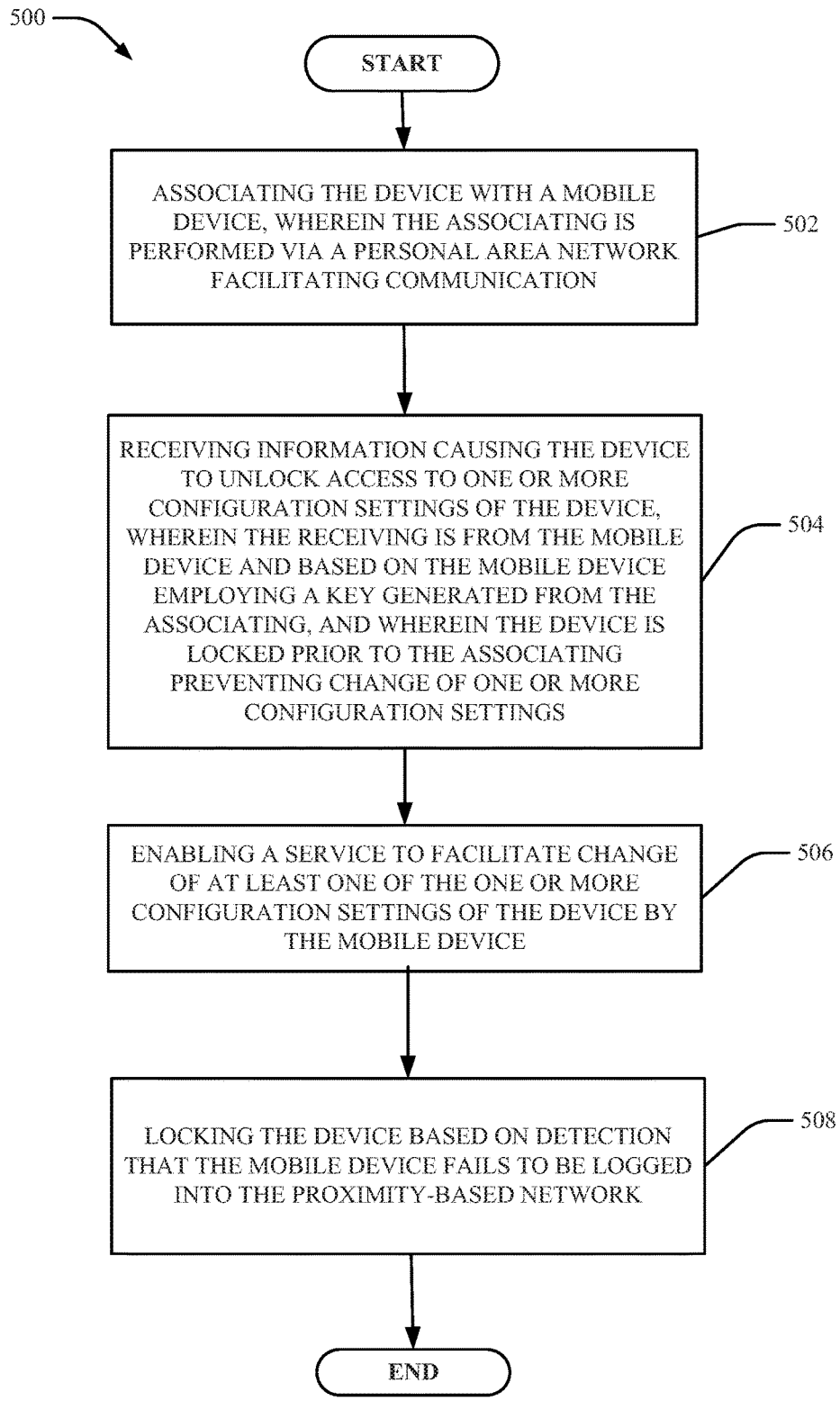

Turning now to FIG. 5, at 502, method 500 can include associating the device with a mobile device, wherein the associating is performed via a personal area network facilitating communication. At 504, method 500 can include receiving information causing the device to unlock access to one or more configuration settings of the device, wherein the receiving is from the mobile device and based on the mobile device employing a key generated from the associating, and wherein the device is locked prior to the associating preventing change of one or more configuration settings.

At 506, method 500 can include enabling a service to facilitate change of at least one of the one or more configuration settings of the device by the mobile device. At 808, method 800 can include locking the device based on detection that the mobile device fails to be logged into the proximity-based network.

Figure 6:
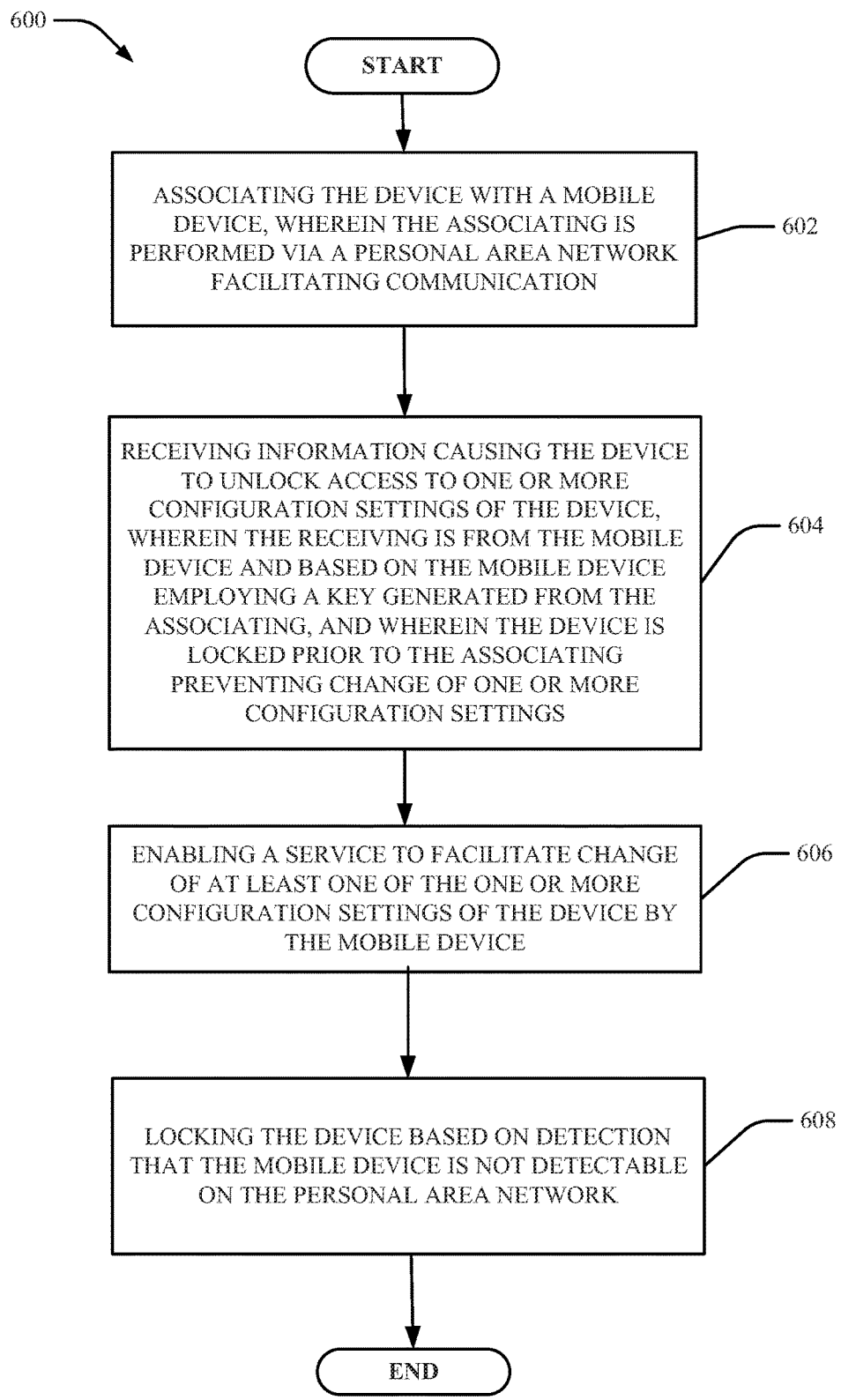

Turning now to FIG. 6, at 602, method 600 can include associating the device with a mobile device, wherein the associating is performed via a personal area network facilitating communication. At 604, method 600 can include receiving information causing the device to unlock access to one or more configuration settings of the device, wherein the receiving is from the mobile device and based on the mobile device employing a key generated from the associating, and wherein the device is locked prior to the associating preventing change of one or more configuration settings.

At 606, method 600 can include enabling a service to facilitate change of at least one of the one or more configuration settings of the device by the mobile device. At 608, method 600 can include locking the device based on detection that the mobile device is not detectable on the personal area network.

Figure 7:
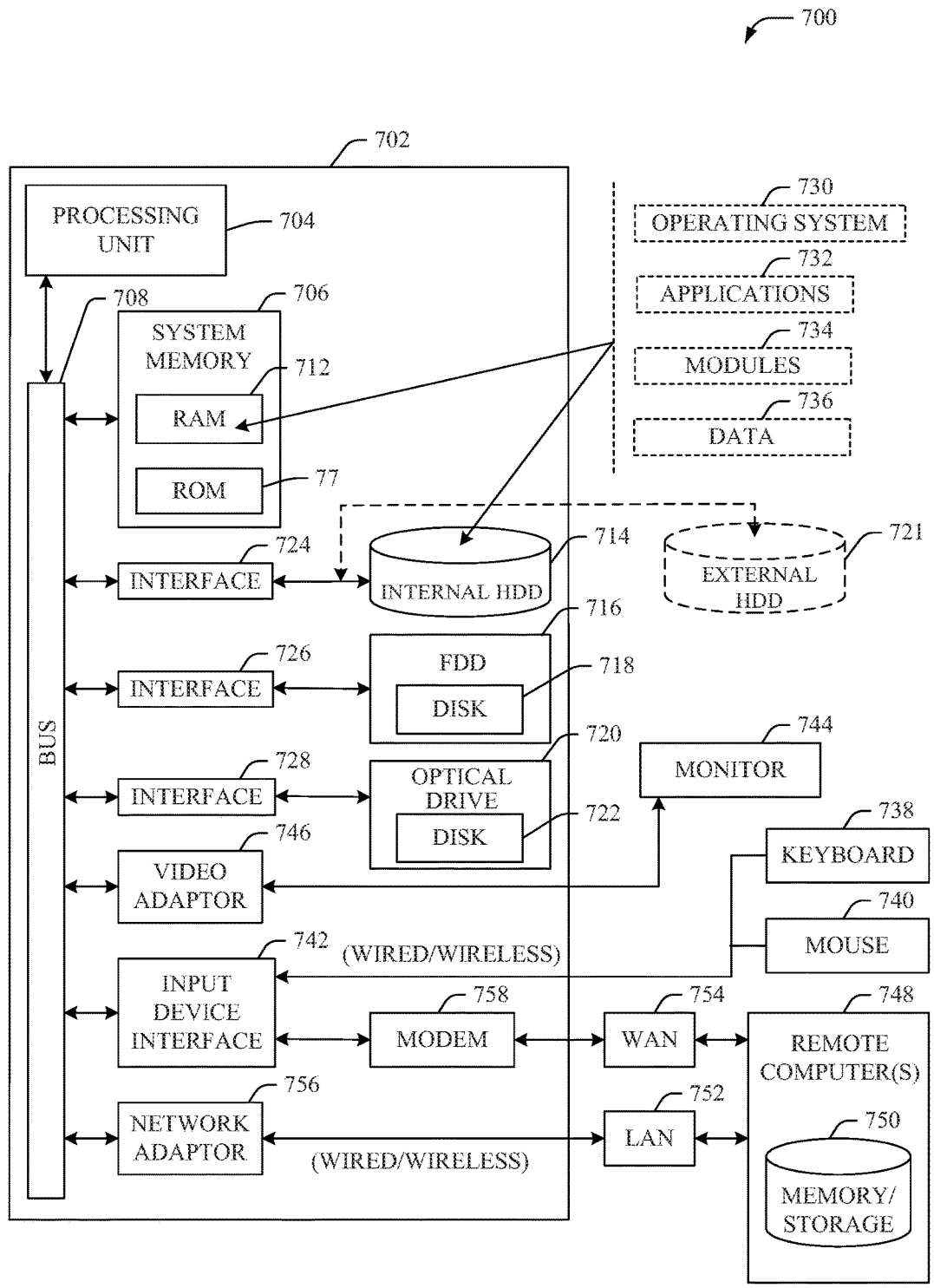
FIG. 7 illustrates a block diagram of a computer operable to facilitate AP management via secure association between an AP and mobile device in accordance with one or more embodiments described herein.

FIG. 7 illustrates a block diagram of a computer operable to facilitate AP management via secure association between an AP and mobile device in accordance with one or more embodiments described herein. Repetitive description of like elements employed in other embodiments described herein is omitted for sake of brevity. In some embodiments, the computer, or a component of the computer, can be or be comprised within any number of components described herein comprising, but not limited to, AP 102, mobile device 104, delegate mobile device 130 and/or cloud device 108 (or a component of AP 102, mobile device 104, delegate mobile device 103 and/or cloud device 108).

In order to provide additional text for various embodiments described herein, FIG. 7 and the following discussion are intended to provide a brief, general description of a suitable computing environment 700 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 7, the example environment 700 for implementing various embodiments of the embodiments described herein comprises a computer 702, the computer 702 comprising a processing unit 704, a system memory 706 and a system bus 708. The system bus 708 couples system components comprising, but not limited to, the system memory 706 to the processing unit 704. The processing unit 704 can be any of various commercially available processors. Dual microprocessors and other multi-processor architectures can also be employed as the processing unit 704.

The system bus 708 can be any of several types of bus structure that can further interconnect to a memory bus (with or without a memory controller), a peripheral bus, and a local bus using any of a variety of commercially available bus architectures. The system memory 706 comprises ROM 710 and RAM 712. A basic input/output system (BIOS) can be stored in a non-volatile memory such as ROM, erasable programmable read only memory (EPROM), EEPROM, which BIOS contains the basic routines that help to transfer information between elements within the computer 702, such as during startup. The RAM 712 can also comprise a high-speed RAM such as static RAM for caching data.

The computer 702 further comprises an internal hard disk drive (HDD) 710 (e.g., EIDE, SATA), which internal hard disk drive 714 can also be configured for external use in a suitable chassis (not shown), a magnetic floppy disk drive 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface, respectively. The interface 724 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 702, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 712, comprising an operating system 730, one or more application programs 732, other program modules 734 and program data 736. All or portions of the operating system, applications, modules, and/or data can also be cached in the RAM 712. The systems and methods described herein can be implemented utilizing various commercially available operating systems or combinations of operating systems.

A communication device can enter commands and information into the computer 702 through one or more wired/wireless input devices, e.g., a keyboard 738 and a pointing device, such as a mouse 740. Other input devices (not shown) can comprise a microphone, an infrared (IR) remote control, a joystick, a game pad, a stylus pen, touch screen or the like. These and other input devices are often connected to the processing unit 704 through an input device interface 742 that can be coupled to the system bus 708, but can be connected by other interfaces, such as a parallel port, an IEEE 1394 serial port, a game port, a universal serial bus (USB) port, an IR interface, etc.

A monitor 744 or other type of display device can be also connected to the system bus 708 via an interface, such as a video adapter 746. In addition to the monitor 744, a computer typically comprises other peripheral output devices (not shown), such as speakers, printers, etc.

The computer 702 can operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically comprises many or all of the elements described relative to the computer 702, although, for purposes of brevity, only a memory/storage device 750 is illustrated. The logical connections depicted comprise wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which can connect to a global communications network, e.g., the Internet.

When used in a LAN networking environment, the computer 702 can be connected to the local network 752 through a wired and/or wireless communication network interface or adapter 756. The adapter 756 can facilitate wired or wireless communication to the LAN 752, which can also comprise a wireless AP disposed thereon for communicating with the wireless adapter 756.

When used in a WAN networking environment, the computer 702 can comprise a modem 758 or can be connected to a communications server on the WAN 754 or has other means for establishing communications over the WAN 754, such as by way of the Internet. The modem 758, which can be internal or external and a wired or wireless device, can be connected to the system bus 708 via the input device interface 742. In a networked environment, program modules depicted relative to the computer 702 or portions thereof, can be stored in the remote memory/storage device 750. It will be appreciated that the network connections shown are example and other means of establishing a communications link between the computers can be used.

The computer 702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments can employ various AI-based schemes for carrying out various embodiments thereof. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis to prognose or infer an action that a communication device desires to be automatically performed. A support vector machine (SVM) is an example of a classifier that can be employed. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A non-transitory computer-readable storage medium storing computer-executable instructions
   that, in response to being executed by a processor of a device, causes the device to perform operations, wherein the operations comprise:
      associating the device with an access point that is locked, wherein the associating is performed via a proximity-based network facilitating communication based on the device and the access point being within a defined distance of one another;
      unlocking the access point employing a key stored within the device, wherein the unlocking the access point causes unlocking access to one or more configuration settings of the access point via the device; and
      enabling a service of the access point and a corresponding service of the device to change at least one of the one or more configuration settings of the access point, wherein the device automatically performs the enabling the change of the one or more configuration settings of the access point without receipt of instructions from a user of the device.

2. The non-transitory computer-readable storage medium of claim 1, wherein the associating the device with the access point comprises performing exchange of information between the device and the access point for secure pairing between the device and the access point.

3. The non-transitory computer-readable storage medium of claim 2, wherein the associating the device with the access point further comprises generating the key associated with the device for access of the access point by the device, wherein the generating is based on completion of the secure pairing.

4. The non-transitory computer-readable storage medium of claim 1, wherein the operations further comprise modifying the at least one of the one or more configuration settings via the device.

5. The non-transitory computer-readable storage medium of claim 1, wherein the device comprises a mobile device.

6. The non-transitory computer-readable storage medium of claim 5, wherein the mobile device comprises a smartphone.

7. The non-transitory computer-readable storage medium of claim 1, wherein the operations further comprise receiving a notification message from a server device based on detection by the server device that a configuration setting of the one or more configuration settings of the access point has changed from a first configuration setting to a second configuration setting, wherein the server device is located remote from the access point.

8. The non-transitory computer-readable storage medium of claim 7, wherein the notification message also includes information indicative of at least one of the second configuration setting or the first configuration setting and the second configuration setting.

9. The non-transitory computer-readable storage medium of claim 7, wherein the operations further comprise generating a disable message requesting disablement of the access point by the server device, wherein the access point cannot be re-enabled until the mobile device is within a defined distance of the access point.

10. The non-transitory computer-readable storage medium of claim 1, wherein the operations further comprise receiving a notification message from a server device based on detection by the server device of an access of the service of the access point that facilitates change of the at least one of the one or more configuration settings via the device.

11. The non-transitory computer-readable storage medium of claim 1, wherein the operations further comprise receiving a notification message from a server device based on detection by the server device of a configuration setting changed by a delegate for the entity associated with the device.

12. The non-transitory computer-readable storage medium of claim 1, wherein the one or more configuration settings is associated with at least one of a firewall rule setting, a parental control setting, a network setting or a domain name system setting.

13. The non-transitory computer-readable storage medium of claim 1, wherein the associating, the unlocking and the enabling are performed employing BLUETOOTH communication protocol.

14. The non-transitory computer-readable storage medium of claim 1, wherein the device comprises at least one of a web-based graphical user interface or a html-based graphical user interface configured to configure the access point.

15. A non-transitory computer-readable storage medium storing computer-executable instructions that, in response to being executed by a processor of a device, causes the device to perform operations, wherein the operations comprise:
   associating the device with a mobile device, wherein the associating is performed via a personal area network facilitating communication;
   receiving information causing the device to unlock access to one or more configuration settings of the device, wherein the receiving is from the mobile device and based on the mobile device employing a key generated from the associating, and wherein the device is locked prior to the associating preventing change of one or more configuration settings; and enabling a service to change at least one of the one or more configuration settings of the device by the mobile device, wherein the mobile device automatically performs the enabling the change of the one or more configuration settings of the device without receipt of instructions from a user external to the mobile device.

16. The non-transitory computer-readable storage medium of claim 15, wherein the operations further comprise receiving change information causing change of one or more of the configuration settings from the mobile device.

17. The non-transitory computer-readable storage medium of claim 15, wherein the operations further comprise locking the device based on detection that the mobile device fails to be logged into the proximity-based network, wherein the detection further comprises detection of a plurality of failed authentication attempts by a second device within a defined proximity of the access point.

18. The non-transitory computer-readable storage medium of claim 15, wherein the operations further comprise locking the device based on detection that the mobile device is not detectable on the personal area network.

19. A device, comprising:
a processor; and
a memory that stores executable instructions that, when executed by the processor, facilitate performance of operations, comprising:
associating the device with a mobile device, wherein the associating is performed via a personal area network facilitating communication;
receiving information causing the device to unlock access to one or more configuration settings of the device, wherein the receiving is from the mobile device and based on the mobile device employing a key generated from the associating, and wherein the device is locked prior to the associating preventing change of one or more configuration settings; and
changing at least one of the one or more configuration settings of the device, wherein the change is based on action taken by the mobile device without receipt, by the mobile device, of instructions from a user of the mobile device.

20. The device of claim 19, wherein the operations further comprise receiving change information causing change of one or more of the configuration settings from the mobile device, wherein the change information is initiated based on an entry received at a user interface of the mobile device.

* * * * *